Oct. 10, 1933.                F. G. HUGHES                1,929,782
                                 CLUTCH
                           Filed Dec. 9, 1931            2 Sheets-Sheet 1

INVENTOR:
FREDERICK G. HUGHES,
BY
HIS ATTORNEY

Oct. 10, 1933.    F. G. HUGHES    1,929,782
CLUTCH
Filed Dec. 9, 1931    2 Sheets-Sheet 2

INVENTOR:
FREDERICK G. HUGHES,
BY
HIS ATTORNEY.

Patented Oct. 10, 1933

1,929,782

UNITED STATES PATENT OFFICE 1,929,782

CLUTCH

Frederick G. Hughes, Bristol, Conn., assignor to The New Departure Manufacturing Company, Bristol, Conn., a corporation of Connecticut Application December 9, 1931. Serial No. 579,883

13 Claims. (Cl. 192—48)

This invention relates to clutches and comprises all of the features of novelty herein disclosed. An object of the invention is to provide an improved free-wheel clutch. Another object is to provide a simple, inexpensive and reliable cage for clutch elements. Another object is to provide a cage having associated clutch operating parts combined with it into a unitary structure. To these ends and to improve generally upon devices of the character indicated, the invention consists in the various matters hereinafter described and claimed.

In its broader aspects, the invention is not necessarily limited to the specific construction selected for illustrative purposes in the accompanying drawings in which Fig. 1 is an axial section of the clutch and associated parts, the section being taken about on the line 1—1 of Fig. 2.

Figure 1:
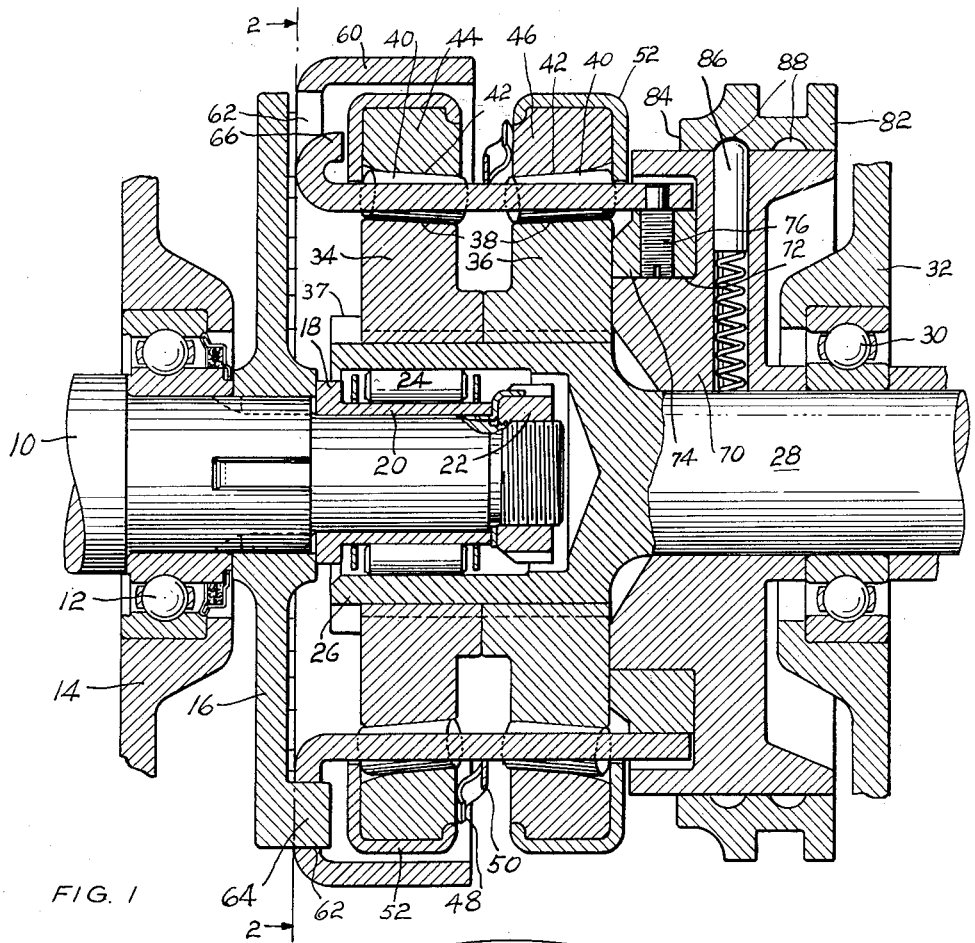
Figure 2:
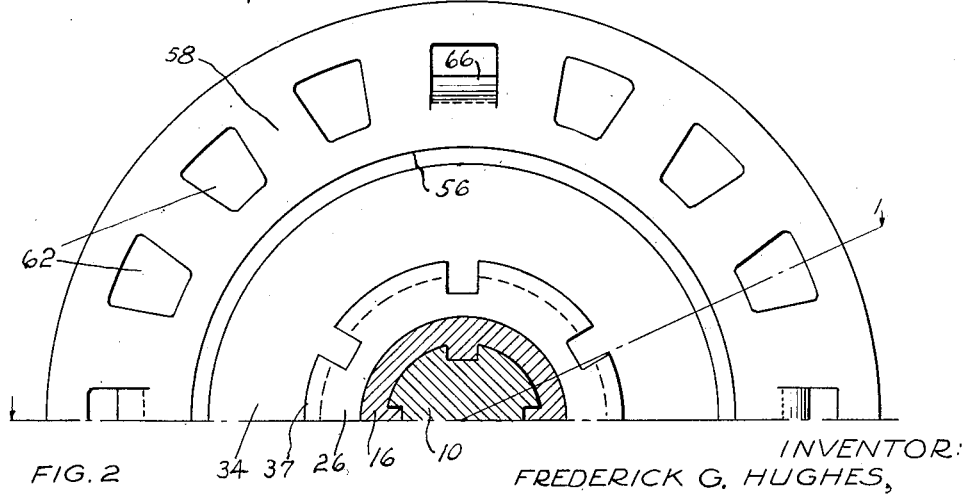
Fig. 2 is a sectional view taken on the line 2—2 of Fig. 1.
Figure 3:
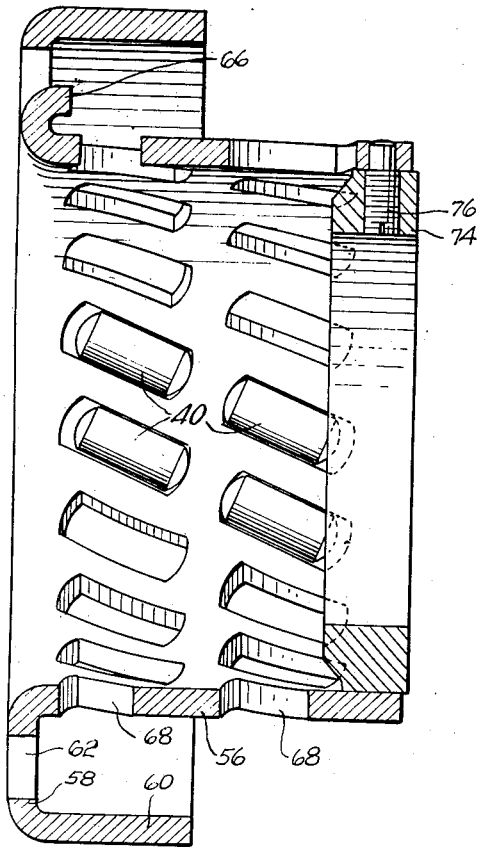
Fig. 3 is a sectional view of the cage and associated parts.

The numeral 10 indicates a main gear shaft journalled by a ball bearing 12 at the rear of a gear box 14 of a motor car, the shaft receiving its power from the engine through the usual main, pedal operated clutch and shift gears. The shaft 10 is keyed to the hub of a drive plate 16 which abuts against the inner race ring of the bearing 12, the plate being held by a flange 18 on a sleeve 20 which is clamped on the shaft by a nut 22. A roller bearing 24 surrounds the sleeve 20 and supports the enlarged hollow end portion 26 of a driven shaft 28 which is journalled for rotation by a ball bearing 30 in a plate 32 which is attached in any suitable way to the gear box or to a separate casing attached to the gear box. A pair of inner clutch rings 34 and 36 have abutting hub portions which are keyed to the enlarged portion 26 of the shaft 28, one of them abutting a flange 37. These inner clutch rings have external clutch surfaces 38 which conform to a hyperboloid of revolution so that skewed clutch elements in the form of cylindrical rollers 40 will have line contact therewith. Both sets of rollers are angled or skewed in the same direction and are arranged to engage hyperbolic internal clutch surfaces 42 on floating outer clutch rings 44 and 46 which are supported by the rollers. The outer clutch rings are urged apart by spring fingers 48 projecting laterally in two directions from a ring 50 which is supported by the cage. Each outer clutch ring is enclosed in a shell or cap plate 52 which is extended inwardly across the adjacent ends of the rollers. The smaller diameters of the clutch surfaces are adjacent.

A drawn sheet metal member forms a combined clutch operating and driving member, roller holding cage and brake drum and comprises a cylindrical sleeve portion 56, an outwardly extending driving web or flange 58, and a brake drum portion 60. The flange 58 has a plurality of openings 62 some of which receive driving lugs 64 projecting into them from the drive plate 16. At other openings, a portion of the metal of the web is bent inwardly as at 66 to form stops to limit axial movement of the outer clutch ring 44. The cylindrical sleeve portion 56 is provided with two series of inclined openings 68, each opening receiving a roller and being long enough to permit the rollers to shift their positions endwise. The ends of the rollers and the ends of the openings are preferably rounded. Such endwise shifting of the rollers is effected by relative rotation between either one of the clutch rings 34 or 36 and the cage with its rollers. One set of rollers tends to roll or shift into positions where the space between the inner and outer clutch members is more restricted while the other set then tends to roll or shift into positions where the space is less restricted. Thus one set of rollers will become locked or jammed between its inner and outer clutch surfaces and so connect the driving cage to the shaft 28. The direction of rotation of the shaft 10 for forward driving or for reverse driving determines which of the clutches shall become operative.

Figure 4:
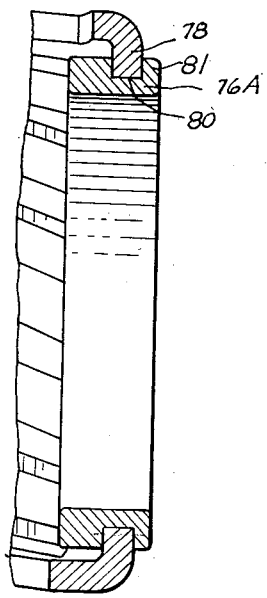
Fig. 4 is a sectional view of a modified construction.
Figure 5:
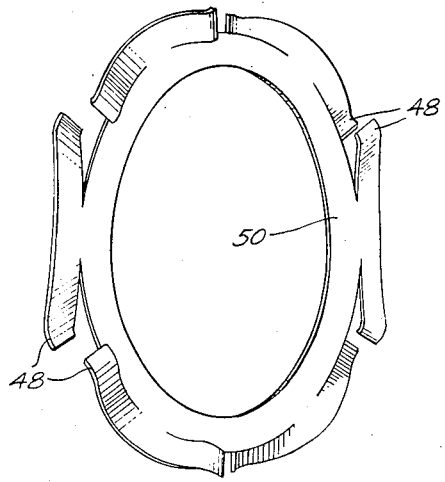
Fig. 5 is a perspective view of a spring.

A support 70 is carried by the shaft 28 between the bearing 30 and the clutch member 36 and is provided with an annular bearing recess 72 to support a ring 74 which is preferably bronze. The ring 74 can rotate relatively to the support 70 and is held in its recess by the clutch member 36. A screw 76 is threaded in the ring and projects outwardly to connect the ring to the cage portion 56. The ring is, in effect, a part of the cage and locates and guides the cage. In Fig. 4, the connection is made by forming a flange 78 on the cage to enter a recess 80 in a ring 76A, the ring being of soft metal such as bronze and having a spun-over part 81 to grip the flange. Slidable axially on the member 70 is a grooved collar 82 having an end face 84 adapted to engage the shell 52 to shift the clutch member 46 against the pressure of spring fingers 48. The collar may be actuated in any suitable way by the driver of the vehicle and is frictionally held in either of its extreme positions by spring pressed pins 86 (preferably three) guided in radial holes of member 70 and entering either of two annular grooves 88 in the collar.

The position of the collar 82 determines whether there is free wheeling or positive drive. In the position shown, if the shaft 10 is positively driving the car forwardly, the rotation of the cage causes the left hand set of rollers to shift and grip the inner clutch member 34 to drive the shaft 28 in the same direction, the other set of rollers being set free. If the shaft 10 is reversed to drive the car backwardly, the right hand set of rollers will shift and grip the clutch member 36, the first set of rollers being set free. If the vehicle is going forwards with the shaft 28 gaining on the cage (as when the vehicle is going down a steep hill with the engine idling and acting as a brake) the shaft 28 drives the cage and the shaft 10 through the right hand clutch, the clutch ring 36 then tending to roll or shift the right hand roller set to clutching position and to free the first set. The outer clutch rings always tend to move or stay with the cage due to pressure of the spring fingers 48. It will be noted that relative rotation of the cage and an inner clutch ring is what shifts the rollers and that a faster movement of an inner clutch ring in the same direction as the corresponding outer clutch ring and cage has the same effect as turning the cage and outer race ring in the opposite direction. For freewheeling, the collar 82 is shifted to the left thus moving clutch member 46 to a position where the corresponding roller set cannot be jammed between the clutch members. Thus the shaft 28 which is driven by the coasting or free-wheeling vehicle and rotating faster than the shaft 10 cannot be clutched to the cage through the right hand roller set. The spring fingers 48 are compressed and tend to hold the clutch member 44 to the left but, as long as the inner clutch member 34 is turning faster than the cage, the left set of rollers tend to shift or roll to positions where the roller space is less restricted and thus the left hand clutch cannot be effective to drive the engine and the engine will not act as a brake. When, however, the engine speed is increased or the speed of the shaft 28 becomes less than that of the cage, the rollers of the left hand set again become effective to deliver a positive drive.

For shifting the collar 82 to produce free wheeling or positive drive, any suitable mechanism may be provided. Such collar will ordinarily be shifted as a result of movement of the usual clutch pedal, the operation of the clutch pedal also applying a brake to the brake drum 60 and so slowing down the gears connected to gear shaft 10. The cage can be conveniently and cheaply made from sheet metal, as by drawing a disc into the form of a flanged cup, cutting off the bottom wall, piercing the roller openings 68 and lug holes 62 and then bending over the flange to form the brake surface.

I claim:

1. In a clutch, a pair of clutch rings, a series of clutch elements between the rings, a cage having a series of openings for the clutch elements, a flange extending outwardly from one end of the cage, and a brake drum projecting from the flange and surrounding the clutch rings; substantially as described.

2. In a clutch, a pair of clutch rings, a series of clutch elements between the rings, a sleeve member having openings for the clutch elements, a rotatable guide ring attached to one end of the sleeve member, and a brake drum projecting from the other end of the sleeve member; substantially as described.

3. In a clutch, a pair of clutch rings, a series of clutch elements between the rings, a sleeve member having openings for the clutch elements, a rotatable guide ring attached to the sleeve member, a drive flange extending outwardly from one end of the sleeve member, and a brake drum projecting from the flange and surrounding the clutch rings; substantially as described.

4. In a roller clutch, a driving cage comprising a sleeve portion having a series of inclined openings which are closed at their ends, a driving flange projecting from one end of the sleeve portion beyond the openings, and a series of rollers retained in the openings and shiftable endwise therein; substantially as described.

5. In a device of the character described, an inner clutch ring, an outer clutch ring, a series of clutch elements between the rings, and a cage extending between the rings and having an extended drum portion surrounding the outer clutch ring; substantially as described.

6. In a device of the character described, an inner clutch ring, an outer clutch ring, a series of clutch elements between the rings, a spring urging one of the clutch rings to clutching position, a support, a collar slidable on the support and movable into or out of contact with the spring-pressed clutch ring to render the clutch operative or inoperative, and means for holding the collar in either position; substantially as described.

7. In a device of the character described, an inner clutch ring, an outer clutch ring, a series of clutch elements between the rings, a spring urging one of the clutch rings to clutching position, a cage member extending between the rings and comprising a sleeve having openings for the clutch elements, a support, a guide ring rotatable on the support and connected to one end of the sleeve, and a member shiftable on the support for moving said spring-pressed clutch ring to unclutching position; substantially as described.

8. In a device of the character described, a pair of inner clutch rings, a pair of outer clutch rings, two series of rolling elements, one pair of clutch rings being shiftable axially to operative or inoperative position, and a ring mounted between the shiftable clutch rings and having spring fingers urging said shiftable rings apart; substantially as described.

9. In a device of the character described, a pair of inner clutch rings, a pair of outer clutch rings, two series of rolling elements, one pair of clutch rings being shiftable axially to operative or inoperative position, a cage having a series of openings for the rolling elements, and a ring mounted on the cage and having spring fingers urging the shiftable rings apart; substantially as described.

10. In a device of the character described, an inner clutch ring, an outer clutch ring, clutch elements between the rings, a sleeve extending between the rings and having openings which are closed at the ends to retain the clutch elements, the openings being inclined to the axis of the rings and being longer than the clutch elements to provide for shifting and locking of the clutch elements between the clutch rings, and means for rotatably driving the sleeve; substantially as described.

11. In a device of the character described, an inner clutch ring, an outer clutch ring, clutch elements between the rings, a cage extending between the rings and comprising a sleeve having openings to retain the clutch elements, the openings being inclined to the axis of the rings to provide for shifting and locking of the clutch elements between the clutch rings, means for rotatably driving the cage, and a rotatable guide ring attached to one end of the cage; substantially as described.

12. In a device of the character described, an inner clutch ring, an outer clutch ring, clutch elements between the rings, a cage extending between the rings and having openings to retain the clutch elements, the openings being inclined to the axis of the rings to provide for shifting and locking of the clutch elements between the clutch rings, means for rotatably driving the cage, and a brake drum carried by the cage; substantially as described.

13. In a device of the character described, an inner clutch ring, an outer clutch ring, clutch elements between the rings, a cage extending between the rings and having openings to retain the clutch elements, the openings being inclined to the axis of the rings to provide for shifting and locking of the clutch elements between the clutch rings, means for rotatably driving the cage, a rotatable guide ring attached to the cage, and a brake drum carried by the cage; substantially as described.

FREDERICK G. HUGHES.